United States Patent
Chen et al.

(10) Patent No.: US 9,183,155 B2
(45) Date of Patent: Nov. 10, 2015

(54) MICROPROCESSOR AND METHOD FOR USING AN INSTRUCTION LOOP CACHE THEREOF

(71) Applicant: ANDES TECHNOLOGY CORPORATION, Hsin-Chu (TW)

(72) Inventors: Zhong-Ho Chen, Taichung (TW); Wei-Hao Chiao, Hsinchu (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 211 days.

(21) Appl. No.: 14/037,395

(22) Filed: Sep. 26, 2013

(65) Prior Publication Data

US 2015/0089141 A1    Mar. 26, 2015

(51) Int. Cl.
G06F 13/00    (2006.01)
G06F 12/08    (2006.01)

(52) U.S. Cl.
CPC .................................. *G06F 12/0875* (2013.01)

(58) Field of Classification Search
CPC .............. G06F 3/0628; G06F 12/0868; G06F 12/0875; G06F 12/0895; G06F 13/38; G06F 13/1673
USPC .......... 711/125, 140, 154, 169; 710/5, 18, 28, 710/36, 56, 310; 712/26, 205, 225, 241
See application file for complete search history.

(56) References Cited

U.S. PATENT DOCUMENTS

| | | | |
|---|---|---|---|
| 5,511,178 A * | 4/1996 | Takeda et al. | 711/125 |
| 5,893,142 A | 4/1999 | Moyer et al. | |
| 5,920,890 A | 7/1999 | Moyer et al. | |
| 6,963,965 B1 | 11/2005 | Anderson | |

FOREIGN PATENT DOCUMENTS

EP    1107110 B1    4/2006

* cited by examiner

*Primary Examiner* — Reba I Elmore
(74) *Attorney, Agent, or Firm* — Jianq Chyun IP Office

(57) ABSTRACT

A microprocessor is provided, which includes a processor core and an instruction loop cache. The processor core provides a fetch address of an instruction stream. The fetch address includes a tag and an index. The instruction loop cache receives the fetch address from the processor core. The instruction loop cache includes a cache array and a tag storage. The cache array stores multiple cache entries. Each cache entry includes a tag identification (ID). The cache array outputs the tag ID of the cache entry indicated by the index of the fetch address. The tag storage stores multiple tag values and output the tag value indicated by the tag ID output by the cache array. The instruction loop cache determines whether a cache hit or a cache miss occurs based on a bitwise comparison between the tag of the fetch address and the tag value output by the tag storage.

20 Claims, 10 Drawing Sheets

MICROPROCESSOR AND METHOD FOR USING AN INSTRUCTION LOOP CACHE THEREOF

BACKGROUND OF THE INVENTION

1. Field of the Invention

The present invention relates to instruction caching. More particularly, the present invention relates to caching an instruction loop executed by a microprocessor.

2. Description of the Related Art

Instruction cache is an essential component of a microprocessor. When a microprocessor needs to fetch an instruction, its processor core sends the fetch address of the instruction to the instruction cache. The fetch address corresponds to an instruction stream, which comprises one or more instructions. The instruction cache supplies the instruction directly from itself to the processor core when the instruction is already stored in the instruction cache. Otherwise, the instruction cache fetches the instruction from the memory where the instruction resides, stores the instruction, and supplies the instruction to the processor core. Since fetching an instruction from an external memory takes much more time and consumes much more power than fetching an instruction from the instruction cache, the instruction cache reduces power consumption and improves processing speed of the microprocessor.

SUMMARY OF THE INVENTION

Applications in embedded systems usually spend a large percentage of execution time in innermost loops. Accordingly, the present invention is directed to a microprocessor including an instruction loop cache and a method for using the instruction loop cache for reducing the power consumption and improving the efficiency of instruction fetching.

According to an embodiment of the present invention, a microprocessor is provided. The microprocessor includes a processor core and an instruction loop cache. The processor core provides a fetch address of an instruction stream. The instruction stream includes one or more instructions. The fetch address includes a tag and an index. The instruction loop cache receives the fetch address from the processor core. The instruction loop cache includes a cache array and a tag storage. The cache array is coupled to the processor core. The cache array stores a first predetermined number of cache entries. Each cache entry includes a tag identification (ID). The cache array outputs the tag ID of the cache entry indicated by the index of the fetch address. The tag storage is coupled to the processor core and the cache array. The tag storage is configured to store a second predetermined number of tag values and output the tag value indicated by the tag ID output by the cache array. The instruction loop cache determines whether a cache hit or a cache miss occurs based on a bitwise comparison between the tag of the fetch address and the tag value output by the tag storage.

According to another embodiment of the present invention, a method for using the aforementioned instruction loop cache is provided. The method includes the following steps: entering a normal state initially, wherein the instruction loop cache is associated with a finite state machine that includes the normal state and an inner state; updating the instruction loop cache with a tag value sent from a processor core to the instruction loop cache when a current state is the normal state and the tag value is different from every tag value previously stored in the instruction loop cache; entering the normal state when the current state is the inner state and the tag value sent from the processor core to the instruction loop cache is different from every tag value previously stored in the instruction loop cache; entering the inner state when the current state is the normal state and an inner signal is received; and determining whether a cache hit or a cache miss occurs in the instruction loop cache based on a comparison between a tag of a fetch address sent from the processor core to the instruction loop cache and one of the tag values stored in the instruction loop cache.

According to another embodiment of the present invention, a method for using the aforementioned instruction loop cache is provided. The method includes the step of sending a tag value related to a hint instruction to the instruction loop cache whenever the hint instruction is fetched and recognized. The hint instruction is associated through the tag value to an instruction loop to be executed after the hint instruction is executed. The instruction loop cache determines whether a cache hit or a cache miss occurs based on a comparison between a tag of a fetch address of an instruction and one of the tag values stored in the instruction loop cache.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
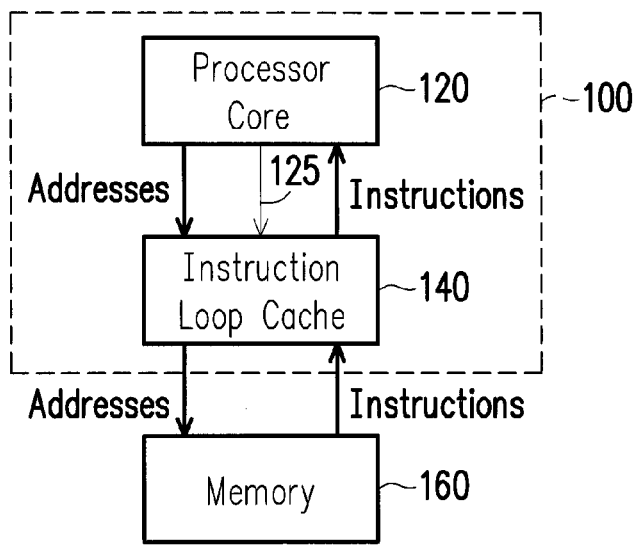
FIG. 1 is a schematic diagram showing a microprocessor according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a microprocessor 100 according to an embodiment of the invention. The microprocessor 100 includes a processor core 120 and an instruction loop cache 140. The instruction loop cache 140 is coupled to the processor core 120 and an external memory 160. The processor core 120 may provide one or more fetch addresses of an instruction stream to the instruction loop cache 140. The instruction stream may include one or more instructions. Each fetch address includes a tag and an index. Here a fetch address of an instruction means the address where the instruction is stored in the memory 160. The fetch address is not the address included in the operand of the instruction.

The instruction loop cache 140 receives the fetch address provided by the processor core 120 and then checks whether a cache hit or a cache miss occurs in response to the fetch address. When the cache hit occurs, the instruction loop cache 140 provides the instruction corresponding to the fetch address directly from the instruction loop cache 140 itself to the processor core 120. When the cache miss occurs, the instruction loop cache 140 fetches the instruction corresponding to the fetch address from the memory 160, stores the instruction, and provides the instruction to the processor core 120.

The processor core 120 may provide one or more tag values to the instruction loop cache 140 through the loop-tag signal 125 in response to a backward branch instruction or a hint instruction. The tag values sent in the loop-tag signal 125 may be different from the tags of the fetch addresses sent by the processor core 120 to the instruction loop cache 140. The tag values sent in the loop-tag signal 125 may also be relative to the fetch addresses sent by the processor core 120 to the instruction loop cache 140. In such case, the loop-tag signal can be implemented with a control signal to indicate the fetch address is relative to the tag values. More details are disclosed below.

Figure 2:
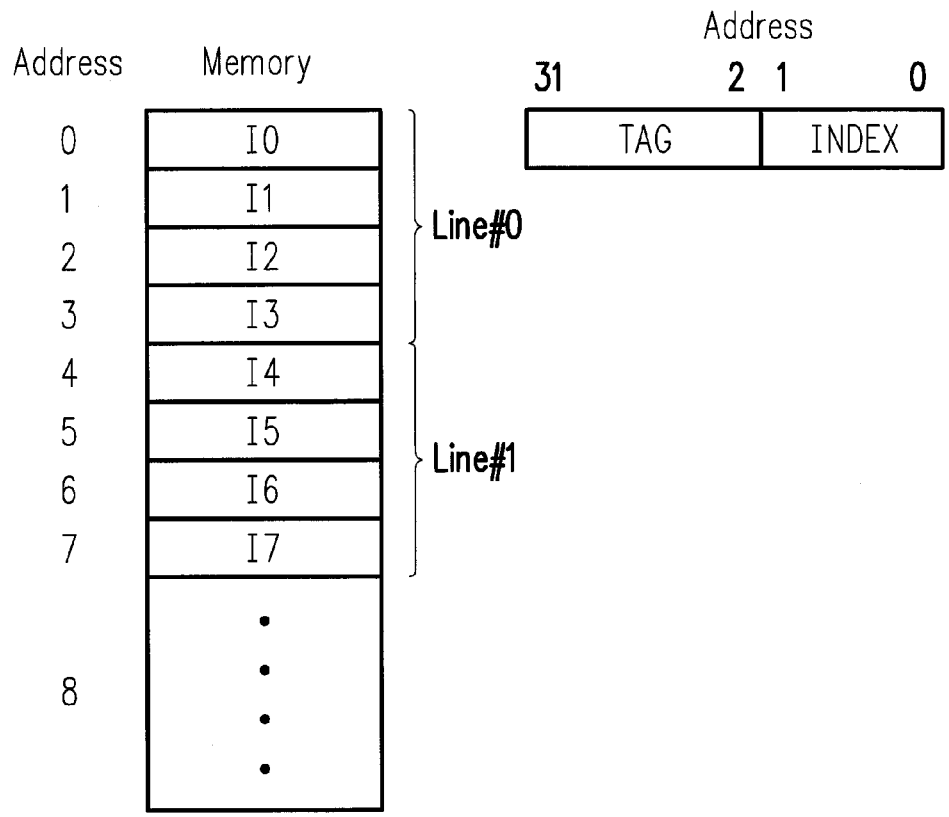
FIG. 2 is a schematic diagram showing cache lines in a memory according to an embodiment of the invention.

FIG. 2 is a schematic diagram showing cache lines in the memory 160 according to an embodiment of the invention. The address of the memory 160 is divided into a tag and an index. In this embodiment, an address has 32 bits, a tag has 30 bits and an index has 2 bits. The numbers of bits of an address, of a tag and of an index may be different in another embodiment. Addresses in the same cache line have the same tag. For example, instructions I0-I3 are located at addresses 0-3, which belong to the same cache line and have the same tag 0. Instructions I4-I7 are located at addresses 4-7, which belong to the same cache line and have the same tag 1.

Figure 3:
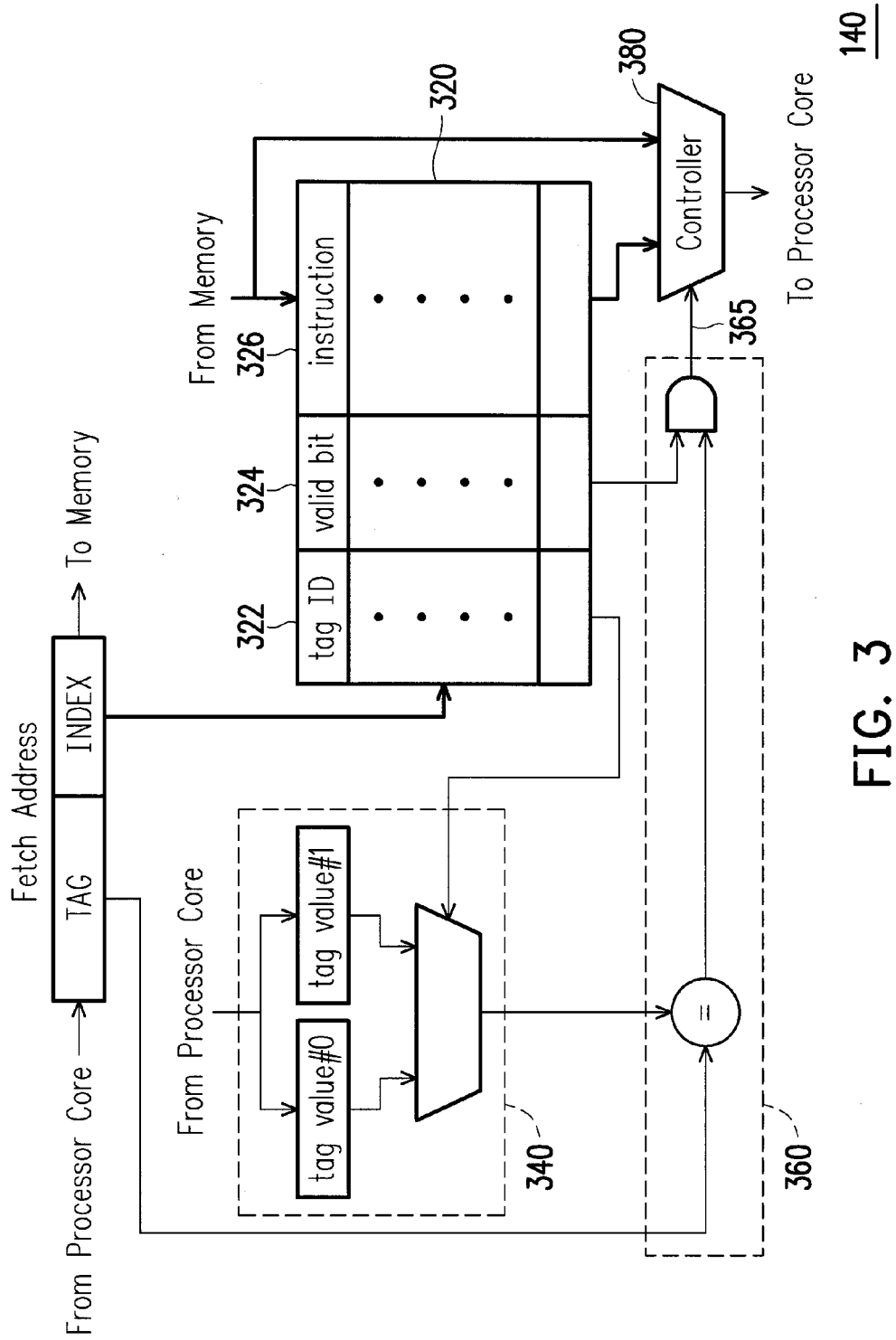
FIG. 3 is a schematic diagram showing an instruction loop cache of a microprocessor according to an embodiment of the invention.

FIG. 3 is a schematic diagram showing the instruction loop cache 140 of the microprocessor 100 according to an embodiment of the invention. The instruction loop cache 140 includes a cache array 320, a tag storage 340, a comparator 360, and a controller 380. The cache array 320 is coupled to the processor core 120 and the memory 160. The tag storage 340 is coupled to the processor core 120 and the cache array 320. The comparator 360 is coupled to the cache array 320 and the tag storage 340. The controller 380 is coupled to the processor core 120, the memory 160, the cache array 320, the tag storage 340, and the comparator 360. The coupling between the tag storage 340 and the controller 380 is not shown in FIG. 3 for simplicity.

The cache array 320 may store $2^N$ cache entries, wherein N is the number of bits of the index of the fetch address provided by the processor core 120. Therefore, the size of the cache array 320 is exactly one cache line in this embodiment. When the cache line is small, the instruction loop cache 140 is relatively tiny.

Each cache entry in the cache array 320 is depicted as a row in FIG. 3. Each cache entry includes three fields, namely, a tag identification (ID) 322, a valid bit 324, and an instruction 326. The tag ID 322 is used to select one of the tag values stored in the tag storage 340. The valid bit 324 indicates whether the cache entry including the valid bit 324 is valid or invalid. A cache entry is valid when its valid bit 324 is set. The instruction 326 is the instruction that is fetched from the memory 160 previously and now cached in the cache entry. The cache array 320 outputs the tag ID 322 of the cache entry indicated by the index of the fetch address provided by the processor core 120. In other words, the cache entries may be numbered from 0 to $2^N-1$ and the cache array 320 may output the tag ID 322 of the cache entry whose number matches the index of the fetch address.

The tag storage 340 stores $2^M$ tag values, wherein M is the number of bits of the tag ID 322 of each cache entry. The tag values in the tag storage 340 are numbered from 0 to $2^M-1$. M is 1 in this embodiment. The tag values are provided by the processor core 120 through the loop-tag signal 125, not through the aforementioned fetch address. The tag storage 340 outputs the tag value indicated by the tag ID 322 output by the cache array 320. In other words, the tag storage 340 outputs the tag value whose number matches the tag ID 322 output by the cache array 320.

The comparator 360 performs a bitwise comparison between the tag of the fetch address provided by the processor core 120 and the tag value output by the tag storage 340. The cache array 320 outputs the valid bit 324 of the cache entry indicated by the index of the fetch address to the comparator 360. The comparator 360 asserts a hit signal 365 to indicate a cache hit when the tag of the fetch address is equal to the tag value output by the cache storage 340 and the valid bit 324 output by the cache array 320 is set. Otherwise, the comparator 360 de-asserts the hit signal 365 to indicate a cache miss.

The controller 380 provides the instruction corresponding to the fetch address to the processor core 120 according to the hit signal 365. Although the controller 380 is depicted as a multiplexer in FIG. 3, the controller 380 is actually more than a multiplexer. More details are disclosed below.

Figure 4:
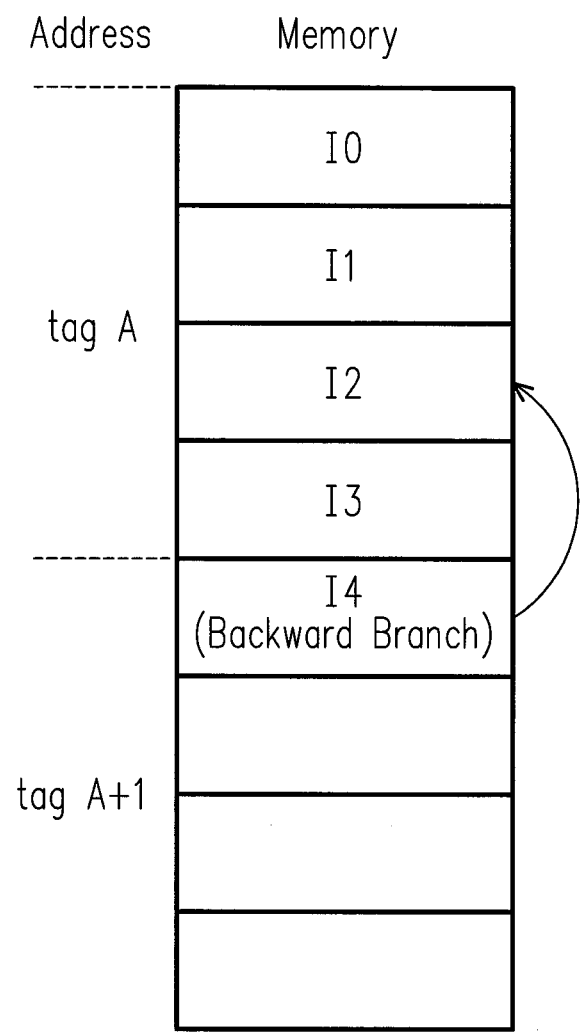
FIG. 4 is a schematic diagram showing an instruction loop according to an embodiment of the invention.

FIG. 4 is a schematic diagram showing an instruction loop in the memory 160 according to an embodiment of the invention. There are five instructions I0-I4 in the memory 160. The addresses of the instructions I0-I3 have the same tag A. The tag of the address of the instruction I4 is A+1. The instruction I4 is a backward branch instruction whose branch target is the instruction I2. Therefore, the instruction loop includes the three instructions I2-I4.

Whenever the processor core 120 executes a backward branch instruction and the backward branch instruction is taken, the processor core 120 sends at least one tag value related to the backward branch instruction to the instruction loop cache 140. The at least one tag value related to the backward branch instruction may be one or more consecutive tag values beginning at the tag of the target address of the backward branch instruction. In this embodiment, the processor core 120 sends two consecutive tag values and the target address of the instruction I4 is the fetch address of I2. Therefore, the processor core 120 sends the tag values A and A+1 to the instruction loop cache 140 by the loop-tag signal 125.

Figure 5:
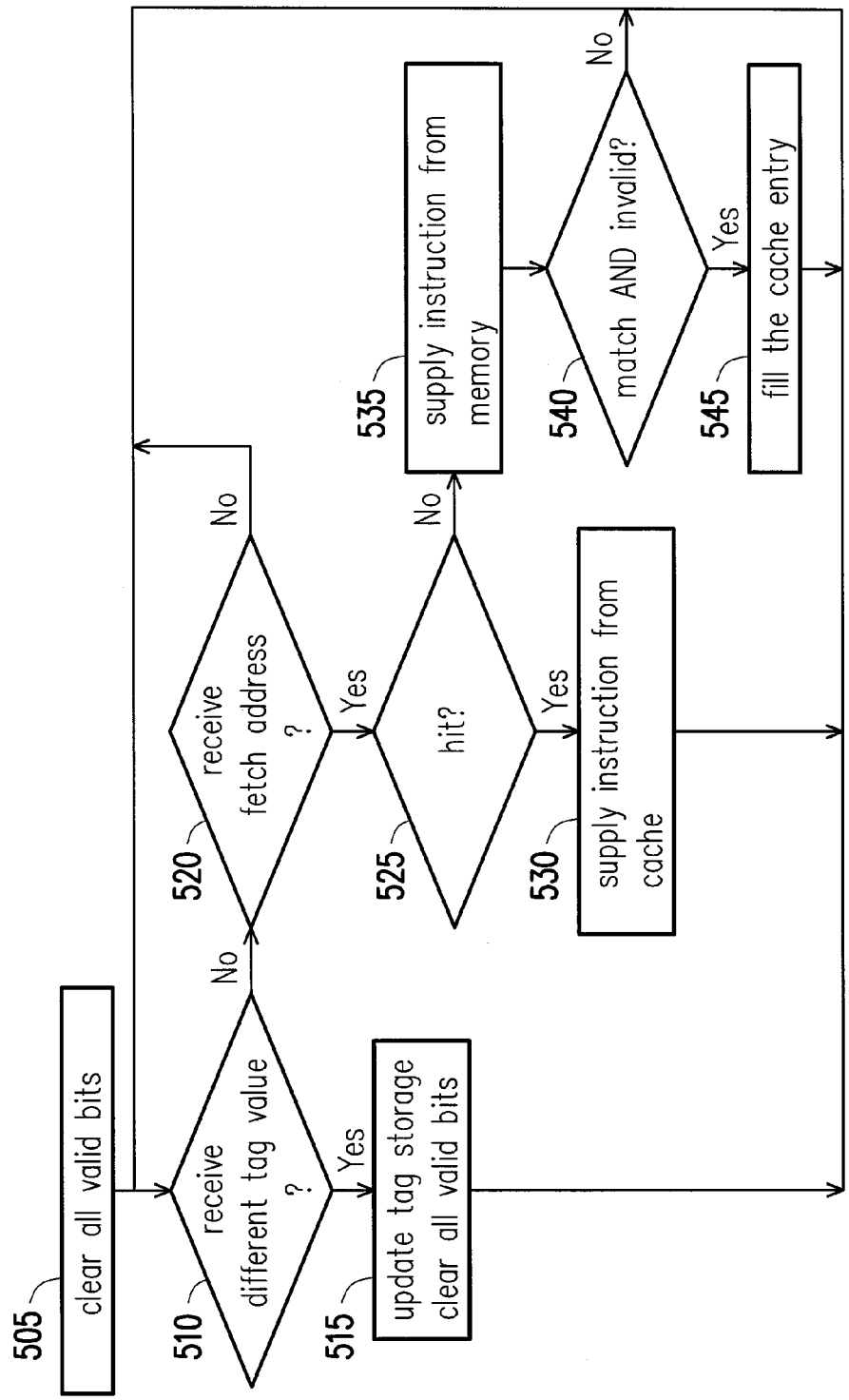
FIG. 5 is a flow chart showing a method for using an instruction loop cache according to an embodiment of the invention.

FIG. 5 is a flow chart showing a method for using an instruction loop cache according to an embodiment of the invention. The method in FIG. 5 may be executed by the controller 380 of the instruction loop cache 140. In step 505, the controller 380 invalidating all cache entries by clearing the valid bit 324 of every cache entry when the microprocessor 100 is reset. In step 510, the controller 380 receives the one or more tag values sent from the processor core 120 and checks whether the tag values sent from the processor core 120 and the tag values stored in the tag storage 340 are different. When any one tag value received by the controller 380 from the processor core 120 is different from every tag value previously stored in the tag storage 340, the flow proceeds to step 515. Otherwise, the flow proceeds to step 520.

In step 515, the controller 380 updates the tag storage 340 with the at least one tag value received from the processor core 120. When the tag storage 340 has vacancy for the at least one tag value received from the processor core 120, the controller 380 updates the tag storage 340 by simply adding the at least one tag value received from the processor core 120 into the tag storage 340. Otherwise, the controller 380 updates the tag storage 340 by replacing the tag values previously stored in the tag storage 340 with the at least one tag value received from the processor core 120 and invalidating all cache entries by clearing the valid bit 324 of each cache entry. Next, the flow returns to step 510.

In step 520, the controller 380 checks whether a fetch address of an instruction is received from the processor core 120. When no fetch address is received, the flow returns to step 510. When such a fetch address is received, the flow proceeds to step 525. In step 525, the controller 380 checks whether the comparator 360 asserts the hit signal 365 or not. When the hit signal 365 is not asserted, the flow proceeds to step 535. When the hit signal 365 is asserted, in step 530, the controller 380 supplies the instruction 326 of the cache entry indicated by the index of the fetch address provided by the processor core 120 to the processor core 120. Next, the flow returns to step 510.

In step 535, the controller 380 fetches the instruction located at the fetch address from the memory 160 and supplies the instruction to the processor core 120. In step 540, the controller 380 checks whether the tag of the fetch address is equal to any one of the tag values stored in the tag storage 340 and the cache entry indicated by the index of the fetch address is invalid. When the condition checked in step 540 is false, the flow returns to step 510. When the condition checked in step 540 is true, in step 545, the controller 380 fills the instruction in the memory 160 located at the fetch address into the cache entry indicated by the index of the fetch address. In addition, the controller 380 sets the tag ID 322 and the valid bit 324 of that cache entry. Next, the flow returns to step 510.

The following Table 1 shows how the microprocessor 100 caches the instructions of the loop shown in FIG. 4. Please refer to FIG. 3, FIG. 4 and FIG. 5 for the following discussions.

TABLE 1

| Cycle | Instruction | Iteration | Tag Storage tag value #0 | Tag Storage tag value #1 | Result |
|---|---|---|---|---|---|
| 0 | I0 | | | | Miss |
| 1 | I1 | | | | Miss |
| 2 | I2 | 1$^{st}$ iteration | | | Miss |
| 3 | I3 | 1$^{st}$ iteration | | | Miss |
| 4 | I4 | 1$^{st}$ iteration | | | Miss |
| 5 | I2 | 2$^{nd}$ iteration | A | A + 1 | Miss/Fill |
| 6 | I3 | 2$^{nd}$ iteration | A | A + 1 | Miss/Fill |
| 7 | I4 | 2$^{nd}$ iteration | A | A + 1 | Miss/Fill |
| 8 | I2 | 3$^{rd}$ iteration | A | A + 1 | Hit |
| 9 | I3 | 3$^{rd}$ iteration | A | A + 1 | Hit |
| 10 | I4 | 3$^{rd}$ iteration | A | A + 1 | Hit |
| 11 | I2 | 4$^{th}$ iteration | A | A + 1 | Hit |
| 12 | I3 | 4$^{th}$ iteration | A | A + 1 | Hit |
| 13 | I4 | 4$^{th}$ iteration | A | A + 1 | Hit |

The column "Cycle" in Table 1 means the clock cycle of the microprocessor 100. In cycle 4, the processor core 120 executes the backward branch instruction I4 and I4 is taken. Consequently, the processor core 120 sends the tag values A and A+1 to the instruction loop cache 140 and the controller 380 store the tag values A and A+1 into the tag storage 340. The processor core 120 repeats sending the tag values A and A+1 in cycles 7, 10 and 13 and the controller 380 simply ignores them because the same tag values are already stored in the tag storage 340.

In cycles 5-7, namely, the second iteration of the instruction loop, there are still cache misses. However, the controller 380 begins to fill the cache array 320 with the instructions fetched from the memory 160 because the tags of the fetch addresses match the tag values in the tag storage 340. Beginning from cycle 8, namely, the third iteration of the instruction loop, cache hit occurs because the instructions I2-I4 are already stored in the cache array 320. Instructions of the third iteration and the following iterations of the instruction loop are supplied from the instruction loop cache 140 instead of the memory 160.

As shown in Table 1, the caching function of the instruction loop cache 140 begins from the third iteration of the instruction loop. In this case, the instruction loop cache 140 would be useless if the instruction loop is executed for just two iterations. In some other embodiments of the invention, a hint instruction may be used to provide enhancement for low-iteration instruction loops.

Figure 6:
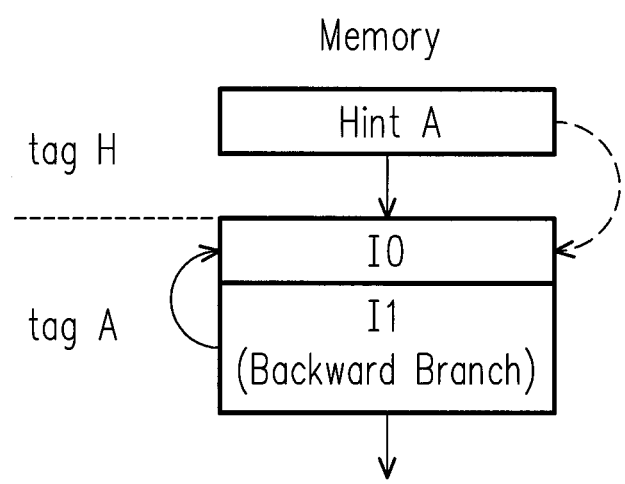
FIG. 6 is a schematic diagram showing an instruction loop according to an embodiment of the invention.

FIG. 6 is a schematic diagram showing an instruction loop according to an embodiment of the invention. A hint instruction "Hint A" is disposed before an instruction loop including two instructions I0 and I1, wherein I1 is a backward branch instruction. In this embodiment, a hint instruction is a conditional branch instruction, which has a target address and a branch condition. The branch condition of a hint instruction is always false. For example, a hint instruction may be in the form "branch to some target address if the value of register 0 is greater than the value of register 0". For compatibility, such a hint instruction may be executed by a microprocessor without the loop instruction cache safely without any result or consequence.

A hint instruction may be added into the instruction stream including the instruction loop by the compiler automatically or by the programmer manually. The hint instruction should be executed by the processor core 120 before the corresponding instruction loop is executed by the processor core 120. The target address of a hint instruction points to the corresponding instruction loop. A hint instruction may be placed flexibly as long as the corresponding instruction loop is reachable within the range of its target address. Therefore, a hint instruction may be placed farther from the instruction loop to eliminate pipeline latency.

The processor core 120 sends a tag value related to a hint instruction to the instruction loop cache 140 whenever the processor core 120 fetches and recognizes the hint instruction. In this embodiment, the tag value related to a hint instruction is the tag of the target address of the hint instruction. The following Table 2 shows how the microprocessor 100 caches the instruction loop shown in FIG. 6.

TABLE 2

| Cycle | Instruction | Iteration | Tag Storage tag value #0 | Tag Storage tag value #1 | Result |
|---|---|---|---|---|---|
| 0 | Hint A | | | | Miss |
| 1 | I0 | 1$^{st}$ iteration | A | | Miss/Fill |

TABLE 2-continued

| Cycle | Instruction | Iteration | Tag Storage tag value #0 | Tag Storage tag value #1 | Result |
|---|---|---|---|---|---|
| 2 | I1 | 1st iteration | A | | Miss/Fill |
| 3 | I0 | 2nd iteration | A | A + 1 | Hit |
| 4 | I1 | 2nd iteration | A | A + 1 | Hit |

In cycle 0, the processor core 120 fetches and recognizes the hint instruction. Consequently, the processor core 120 sends the tag value A to the instruction loop cache 140 and the controller 380 store the tag value A into the tag storage 340. In cycles 1 and 2, namely, the first iteration of the instruction loop, there are cache misses. However, the controller 380 begins to fill the cache array 320 with the instructions fetched from the memory 160 because the tag of the fetch addresses matches the tag value A in the tag storage 340. In cycle 2, the processor core 120 executes the backward branch instruction I1 and I1 is taken. Consequently, the processor core 120 sends the tag values A and A+1 to the instruction loop cache 140. Beginning from cycle 3, namely, the second iteration of the instruction loop, cache hit occurs because the instructions I0-I1 are already stored in the cache array 320. As shown in Table 2, the caching function of the instruction loop cache 140 begins from the second iteration, which is one iteration earlier than the example shown in Table 1.

In some other embodiments of the invention, the hint instruction does not have to include a target address. In those embodiments, the hint instruction may be a no-operation instruction. For compatibility, the no-operation hint instruction may be executed by a microprocessor without instruction loop cache safely without any result or consequence. The hint instruction without target address should be placed immediately before the corresponding instruction loop. The processor core 120 still sends a tag value related to the hint instruction without target address to the instruction loop cache 140 whenever the processor core 120 fetches and recognizes the hint instruction without target address. However, the tag value related to such a hint instruction is the tag of the fetch address of the first instruction of the corresponding instruction loop, namely, the tag of the fetch address next to that of the hint instruction.

Figure 7:
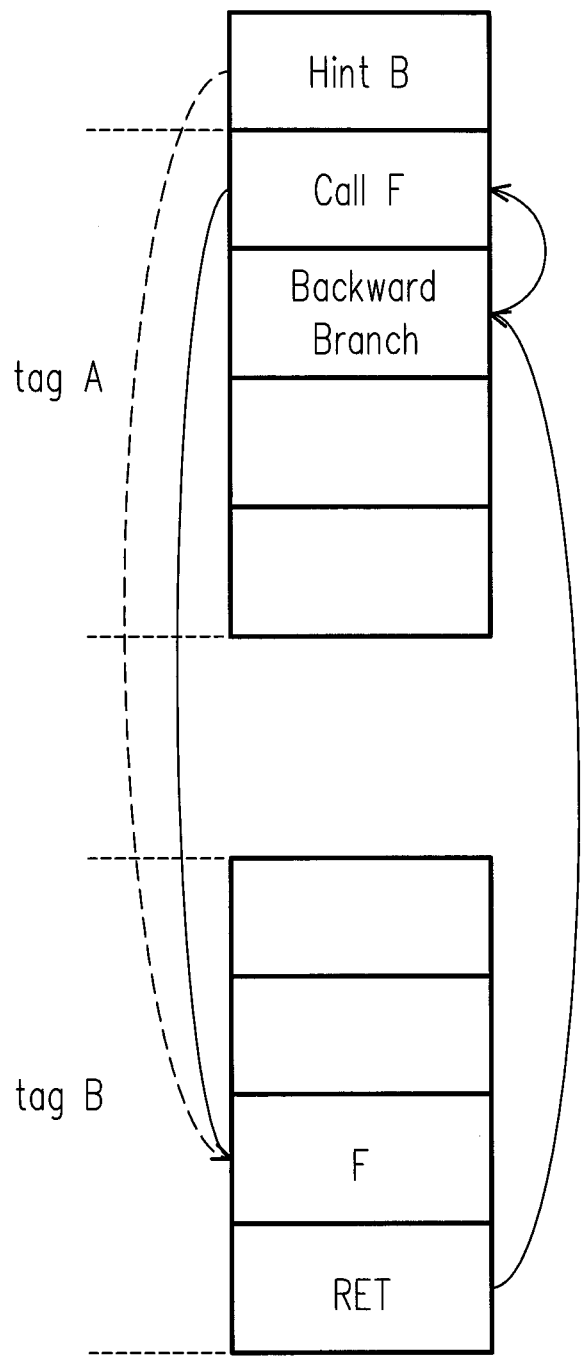
FIG. 7 is a schematic diagram showing another instruction loop according to an embodiment of the invention.

FIG. 7 is a schematic diagram showing another instruction loop according to an embodiment of the invention. This embodiment provides enhancement for instruction loops having function calls. The instruction stream shown in FIG. 7 includes a hint instruction, an instruction loop and a function. The addresses of the instructions of the loop have the same tag A, while the addresses of the instructions of the function have the same tag B. The loop has two instructions. The first instruction of the loop calls the function. The second instruction of the loop is a backward branch instruction.

A hint instruction "Hint B" associated with the instruction loop is used in this embodiment so that the processor core 120 can send a tag value to the instruction loop cache 140 in advance. The hint instruction in this embodiment is a conditional branch instruction with a branch condition and a target address. The branch condition is always false. The target address points to the function to be called in the corresponding instruction loop. The hint instruction should be executed by the processor core 120 before the processor core 120 executes the instruction loop. The processor core 120 sends a tag value related to the hint instruction to the instruction loop cache 140 whenever the processor core 120 fetches and recognizes the hint instruction. The tag value related to the hint instruction in this embodiment is the tag of the fetch address of the first instruction of the function that is called in the corresponding instruction loop.

When the processor core 120 fetches and recognizes the hint instruction, the processor core 120 sends a tag value B to the instruction loop cache 140. The controller 380 stores the tag value B into the tag storage 340. When the processor core 120 executes the instruction loop in the first iteration, the controller 380 fetches the instructions of the loop from the memory 160 and then provides the instructions to the processor core 120. The controller 380 does not store the instructions of the loop into the cache array 320 in the first iteration because the tag value A is not stored in the tag storage 340 yet. However, the controller 380 stores the instructions of the function called in the first iteration into the cache array 320 because the tag value B is already stored in the tag storage 340. When the processor core 120 executes the backward branch instruction in the first iteration, the processor core 120 sends the tag value A to the instruction loop cache 140 and the controller 380 stores the tag value A in the tag storage 340. Consequently, the controller 380 stores the instructions of the loop into the cache array 320 in the second iteration. From this moment, the controller 380 provides the instructions of the loop and the function to the processor core 120 directly from the cache array 320.

The tag storage 340 in this embodiment stores two tag values, namely, the tag value A of the instruction loop and the tag value B of the function. Therefore, the cache array 320 can store the instructions of the loop and the instructions of the function.

Figure 8:
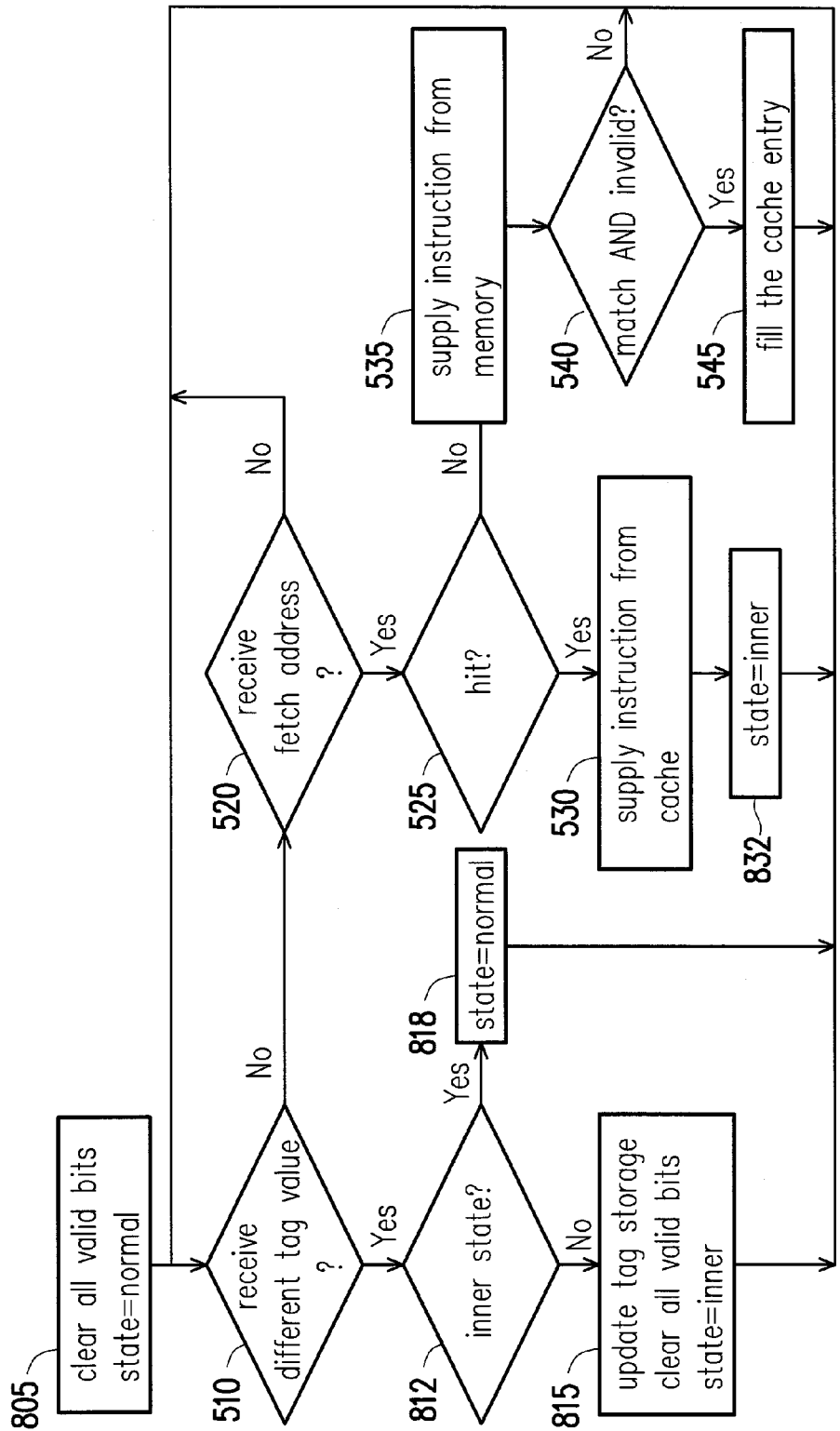
FIG. 8 is a flow chart showing a method for using an instruction loop cache according to an embodiment of the invention.

FIG. 8 is a flow chart showing a method for using the instruction loop cache 140 according to another embodiment of the invention. This embodiment provides enhancement for a nested loop, namely, a loop inside another loop. The method shown in FIG. 8 may be executed by the controller 380. The controller 380 in this embodiment is associated with a finite state machine that includes a normal state and an inner state. The inner state is corresponding to the nested loop. Some steps in the flow chart in FIG. 8 are the same as their counterparts in the flow chart in FIG. 5. Those steps have the same numbers in both FIG. 5 and FIG. 8 and their discussions are omitted here. The discussions below focus on the steps that are different from the flow chart in FIG. 5.

In step 805, the controller 380 enters the normal state and invalidates every cache entry by clearing all of the valid bits 324 of the cache entries. In step 812, the controller 380 checks whether the current state is the normal state or the inner state. When the controller 380 is in the inner state, the controller 380 enters the normal state in step 818, and then the flow returns to step 510. When the controller 380 is in the normal state, the controller 380 enters the inner state in step 815. In addition, in step 815, the controller 380 updates the tag storage 340 in the same way as step 515, and then the flow returns to step 510. After step 530, the controller 380 enters the inner state in step 832, and then the flow returns to step 510.

Figure 9:
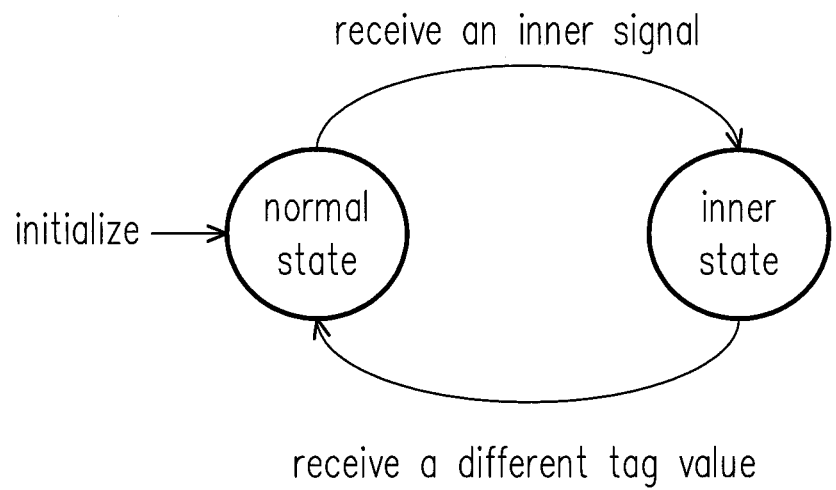
FIG. 9 is a schematic diagram showing a finite state machine associated with an instruction loop cache according to an embodiment of the invention.

FIG. 9 is a schematic diagram showing the finite state machine associated with the controller 380 according to an embodiment of the invention. As shown in FIG. 8 and FIG. 9, the controller 380 enters the normal state initially in step 805. The controller 380 enters the inner state from the normal state when the controller 380 receives an inner signal. The inner signal is intended to indicate the inner loop is executed. In this embodiment, the controller 380 asserts the inner signal in step 815 when the at least one tag value received by the controller 380 from the processor core 120 is different from every tag value previously stored in the tag storage 340. The controller 380 also asserts the inner signal in step 832 when the comparator 360 asserts the hit signal 365. Alternatively, the controller 380 may assert the inner signal when the tag value received by the controller 380 is identical to any tag value previously stored in the tag storage 340. Although two examples are shown, many others are possible and all such inner signal generation is intended to be within the scope of this disclosure.

The controller 380 enters the normal state from the inner state in step 818 when the at least one tag value received by the controller 380 from the processor core 120 is different from every tag value previously stored in the tag storage 340. Steps 812 and 818 avoid invalidating the cache entries storing instructions of the inner instruction loop. Due to steps 812 and 818, the controller 380 does not update the tag values stored in the tag storage 340 in the inner state. The controller 380 updates the tag values stored in the tag storage 340 only in the normal state.

Figure 10:
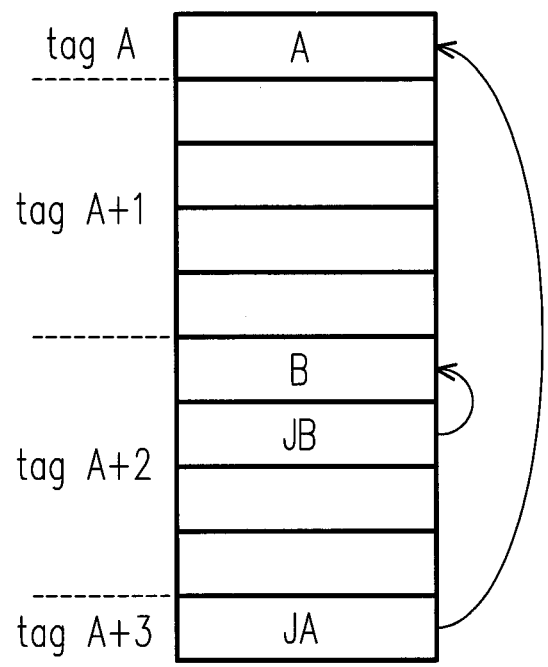
FIG. 10 is a schematic diagram showing an instruction loop according to an embodiment of the invention.

FIG. 10 is a schematic diagram showing an instruction loop according to an embodiment of the invention. The instruction loop in FIG. 10 includes a nested inner loop and spans four cache lines, whose tags are A, A+1, A+2 and A+3, respectively. The instruction JB is the backward branch instruction of the inner instruction loop, while the instruction JA is the backward branch instruction of the outer instruction loop. The following Table 3 shows how the microprocessor 100 caches the instructions in FIG. 10.

TABLE 3

| | | | Tag Storage | | |
|---|---|---|---|---|---|
| Cycle | Instruction | State | tag value #0 | tag value #1 | Result |
| $C_{11}$ | A | normal | | | Miss |
| ... | | | | | |
| $C_{21}$ | B | normal | | | Miss |
| $C_{22}$ | JB | normal | | | Miss |
| $C_{23}$ | B | inner | A + 2 | A + 3 | Miss/Fill |
| $C_{24}$ | JB | inner | A + 2 | A + 3 | Miss/Fill |
| ... | | | | | |
| $C_{31}$ | JA | inner | A + 2 | A + 3 | Miss |
| $C_{32}$ | A | normal | A + 2 | A + 3 | Miss |
| ... | | | | | |
| $C_{41}$ | B | normal | A + 2 | A + 3 | Hit |
| $C_{42}$ | JB | inner | A + 2 | A + 3 | Hit |
| $C_{43}$ | B | inner | A + 2 | A + 3 | Hit |
| $C_{44}$ | JB | inner | A + 2 | A + 3 | Hit |
| ... | | | | | |
| $C_{51}$ | JA | inner | A + 2 | A + 3 | Miss |
| $C_{52}$ | A | normal | A + 2 | A + 3 | Miss |

In cycle $C_{22}$, the processor core 120 executes the backward branch instruction JB and JB is taken. Consequently, the processor core 120 sends the tag values A+2 and A+3 to the instruction loop cache 140 and the controller 380 store the tag values A+2 and A+3 into the tag storage 340. In addition, the controller 380 enters the inner state from the normal state. In cycles $C_{23}$ and $C_{24}$, namely, the second iteration of the inner instruction loop, the controller 380 fills the cache array 320 with the instructions fetched from the memory 160 because the tags of the fetch addresses match the tag values in the tag storage 340.

In cycle $C_{31}$, the processor core 120 fetches the backward branch instruction JA and there is a cache miss. The controller 380 does not fill the cache array 320 with the instruction JA fetched from the memory 160 because the array entry is occupied by the instruction B. When the processor core 120 executes the backward branch instruction JA and JA is taken, the processor core 120 sends the tag values A and A+1 to the instruction loop cache 140. Since the controller 380 is in the inner state, the controller 380 ignores those tag values and enters the normal state. There is a cache miss in cycle $C_{32}$ because the tag A of the fetch address is different from the tag values in the tag storage 340.

In cycles $C_{41}$—$C_{44}$, the inner instruction loop is executed for the third and the fourth iterations. There are cache hits because the tags of the fetch addresses are already stored in the tag storage 340. In cycle $C_{42}$, the controller 380 enters the inner state from the normal state because of the cache hit.

In cycle $C_{51}$, there is a cache miss because the instruction JA is not stored in the cache array 320. When the processor core 120 executes the backward branch instruction JA and JA is taken, the processor core 120 sends the tag values A and A+1 to the instruction loop cache 140. Since the controller 380 is in the inner state, the controller 380 ignores those tag values and enters the normal state. There is a cache miss in cycle $C_{52}$ because the tag A of the fetch address is different from the tag values in the tag storage 340.

In this embodiment, the instructions of the innermost loop are all cached in the instruction loop cache 140. This is the most efficient way because the innermost loop is the most frequently executed.

Figure 11:
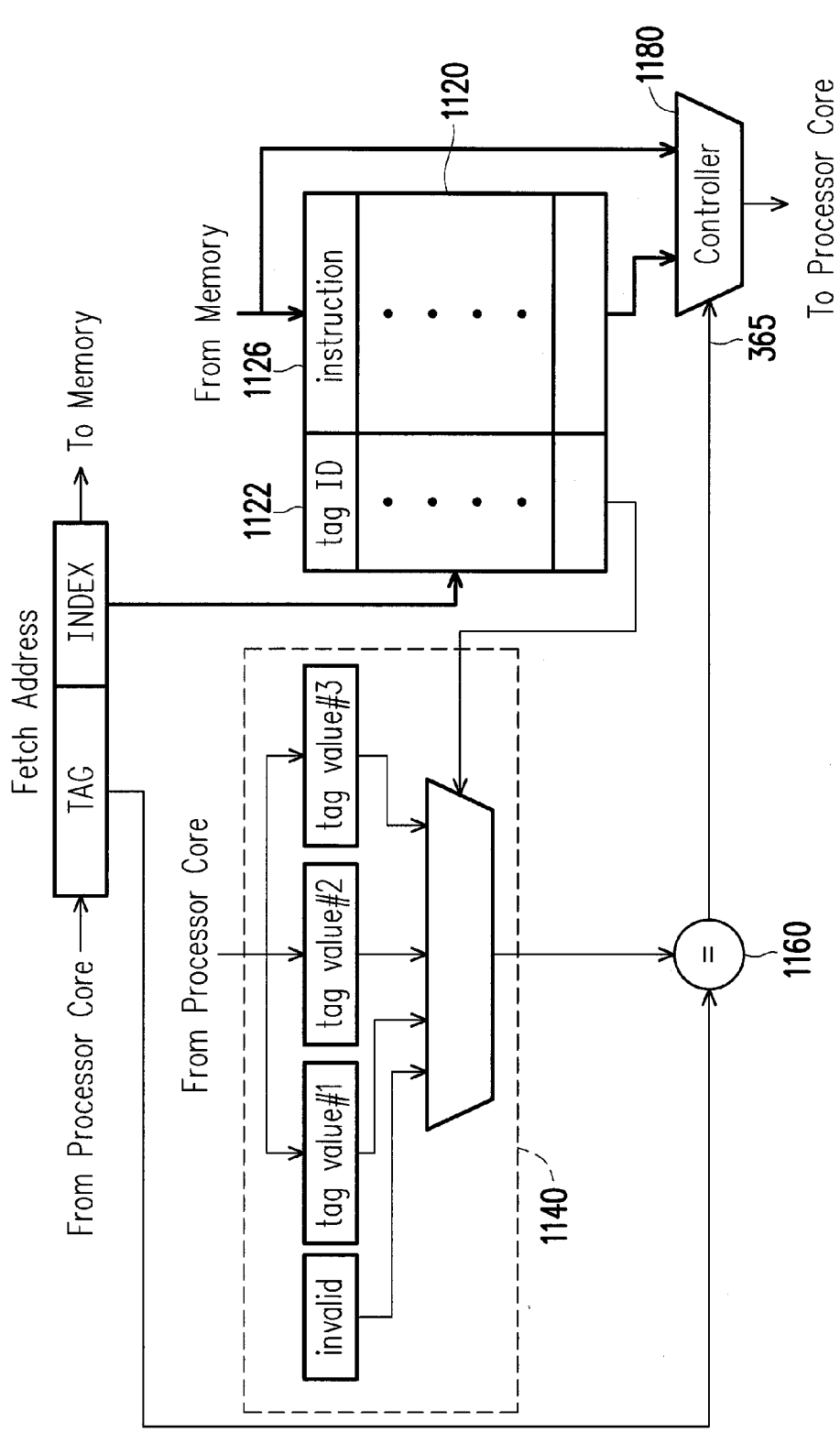
FIG. 11 is a schematic diagram showing an instruction loop cache of a microprocessor according to an embodiment of the invention.

FIG. 11 is a schematic diagram showing the instruction loop cache 140 of the microprocessor 100 according to another embodiment of the invention. This embodiment provides enhancement for loops crossing multiple cache line boundaries. The instruction loop cache 140 in this embodiment includes the cache array 1120, the tag storage 1140, the comparator 1160, and the controller 1180.

The tag storage 1140 has a larger capacity for storing more tag values for longer instruction loops. Accordingly, the processor core 120 may send more tag values to the instruction loop cache 140 when a backward branch instruction is executed and taken. Moreover, the valid bit in every cache entry is merged into the tag ID of the same cache entry. As shown in FIG. 11, each cache entry in the cache array 1120 includes two fields, namely, the tag ID 1122 and the instruction 1126. The instruction field 1126 is the same as the instruction field 326 in FIG. 3. The tag ID 1122 of each cache entry has M bits, while the tag storage 1140 has a capacity for storing $2^M-1$ tag values. M is equal to 2 in this embodiment. The tag values in the tag storage 1140 are numbered from 1 to $2^M-1$. The tag ID 1122 of a cache entry is used to select the tag value with the same number as the tag ID 1122. The cache array 1120 outputs the tag ID 1122 of the cache entry indicated by the index of the fetch address provided by the processor core 120 to the tag storage 1140. The tag storage 1140 outputs the tag value indicated by the tag ID 1122 output by the cache array 1120.

When the tag ID 1122 output by the cache array 1120 is equal to a predetermined value, which is 0 in this embodiment, the tag storage 1140 outputs a predetermined invalid tag value. The invalid tag value is a unique value different from the tag of any fetch address so that there is no cache hit when the tag storage 1140 outputs the invalid tag value. When the value of the tag ID 1122 of a cache entry is the predetermined value corresponding to the invalid tag value, this means the cache entry is invalid. Therefore, when the controller 1180 needs to invalidate a cache entry, the controller 1180 clears the tag ID 1122 of the cache entry to the predetermined value corresponding to the invalid tag value.

The comparator 1160 performs a bitwise comparison between the tag value output by the tag storage 1140 and the tag of the fetch address provided by the processor core 120. The comparator 1160 asserts the hit signal 365 to indicate a cache hit when the tag of the fetch address is equal to the tag value output by the tag storage 1140. Otherwise, the comparator 1160 de-asserts the hit signal 365 to indicate a cache miss.

The other details about the instruction loop cache 140 in FIG. 11 are the same as those about the instruction loop cache 140 in FIG. 3.

Figure 12:
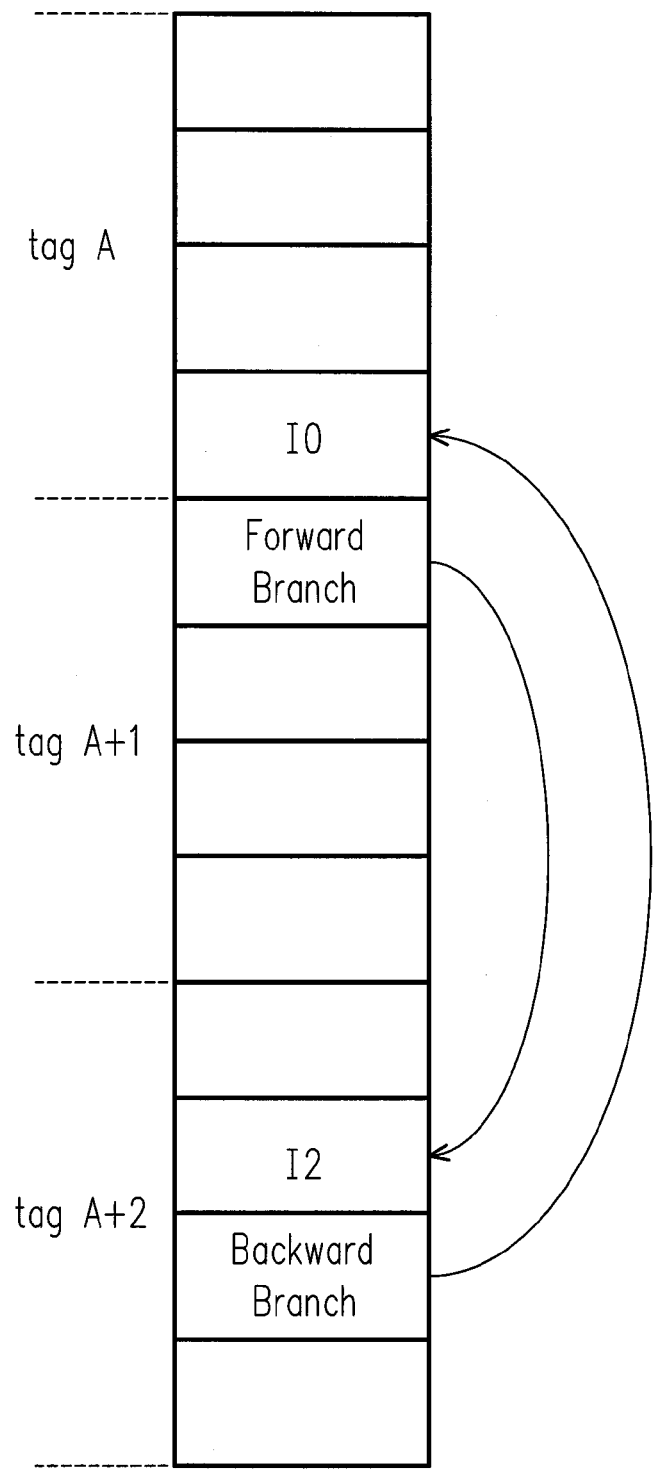
FIG. 12 is a schematic diagram showing an instruction loop according to an embodiment of the invention.

FIG. 12 is a schematic diagram showing an instruction loop according to an embodiment of the invention. The instruction loop in FIG. 12 includes a forward branch instruction whose branch target is the instruction I2 and a backward branch instruction whose branch target is the instruction I0. This embodiment is similar to the embodiment shown in FIG. 4, with some differences. The first difference is that the tag storage 1140 can store up to three tag values instead of two tag values. The second difference is that, when the processor core 120 executes a backward branch instruction and the backward branch instruction is taken, the processor core 120 sends three consecutive tag values to the instruction loop cache 140 instead of two consecutive tag values. Therefore, when the processor core 120 executes the backward branch instruction in FIG. 12 and the backward branch instruction is taken, the processor core 120 sends three consecutive tag values A, A+1 and A+2 to the instruction loop cache 140. Accordingly, the instruction loop cache 140 stores the instructions I0, I2, the forward branch instruction and the backward branch instruction of the loop in the second iteration. Next, the instruction loop cache 140 can supply those instructions directly from the cache array 1120 in the third iteration.

In summary, the instruction loop cache provided by the invention can effectively cache instructions of an instruction loop. The instruction loop cache can be built in a tiny size to save power and chip space. The instruction loop cache is applicable to instruction loops with function calls, instruction loops crossing multiple cache line boundaries, and nested instruction loops. In addition, the instruction loop cache can begin supplying instructions from the second iteration of an instruction loop, which is a very fast response to loop execution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A microprocessor, comprising:
a processor core, providing a fetch address of an instruction stream, wherein the instruction stream comprises one or more instructions, and wherein the fetch address comprises a tag and an index; and
an instruction loop cache, receiving the fetch address from the processor core, comprising:
a cache array, coupled to the processor core, storing a first predetermined number of cache entries, wherein each said cache entry comprises a tag identification (ID), and wherein the cache array outputs the tag ID of the cache entry indicated by the index of the fetch address; and
a tag storage, coupled to the processor core and the cache array, configured to store a second predetermined number of tag values and output the tag value indicated by the tag ID output by the cache array, wherein the instruction loop cache determines whether a cache hit or a cache miss occurs based on a bitwise comparison between the tag of the fetch address and the tag value output by the tag storage.

2. The microprocessor of claim 1, wherein the processor core sends at least one tag value related to a backward branch instruction to the instruction loop cache whenever said backward branch instruction is taken.

3. The microprocessor of claim 2, wherein the at least one tag value related to the backward branch instruction is one or more consecutive tag values beginning at a tag of a target address of the backward branch instruction.

4. The microprocessor of claim 1, wherein the processor core sends a tag value related to a hint instruction to the instruction loop cache whenever the processor core fetches and recognizes the hint instruction.

5. The microprocessor of claim 4, wherein the hint instruction is a conditional branch instruction whose branch condition is always false and the tag value related to the hint instruction is a tag of a target address of the conditional branch instruction.

6. The microprocessor of claim 5, wherein the target address points to an instruction loop to be executed by the processor core after the processor core executes the hint instruction.

7. The microprocessor of claim 5, wherein the target address points to a function to be called in an instruction loop to be executed by the processor core after the processor core executes the hint instruction.

8. The microprocessor of claim 4, wherein the hint instruction is a no-operation instruction, the hint instruction is placed immediately before an instruction loop to be executed by the processor core, and the tag value related to the hint instruction is a tag of a fetch address of a first instruction of the instruction loop.

9. The microprocessor of claim 1, wherein each said cache entry further comprises a valid bit and the instruction loop cache further comprises:
a comparator, coupled to the processor core, the tag storage and the cache array, asserting a hit signal to indicate the cache hit when the tag of the fetch address is equal to the tag value output by the tag storage and the valid bit of the cache entry indicated by the index of the fetch address is set, and otherwise de-asserting the hit signal to indicate the cache miss.

10. The microprocessor of claim 1, wherein the tag storage outputs an invalid tag value when the tag ID output by the cache array is equal to a predetermined value, the invalid tag value is a unique value different from the tag of any fetch address, and the instruction loop cache further comprises:
a comparator, coupled to the processor core and the tag storage, asserting a hit signal to indicate the cache hit when the tag of the fetch address is equal to the tag value output by the tag storage, and otherwise de-asserting the hit signal to indicate the cache miss.

11. The microprocessor of claim 1, wherein each said cache entry further comprises an instruction and the instruction loop cache further comprises:
a controller, coupled to the processor core, the cache array, the tag storage and a memory, supplying the instruction of the cache entry indicated by the index of the fetch address to the processor core when the cache hit occurs, supplying an instruction in the memory located at the fetch address to the processor core when the cache miss occurs, and filling the instruction in the memory located at the fetch address into the cache entry indicated by the index of the fetch address when the cache miss occurs and the tag of the fetch address is equal to one of the tag values stored in the tag storage and the cache entry indicated by the index of the fetch address is invalid.

12. The microprocessor of claim 11, wherein the controller updates the tag storage with a tag value received by the controller from the processor core when the tag value received from the processor core is different from every tag value previously stored in the tag storage.

13. The microprocessor of claim 12, wherein the controller updates the tag storage by adding the tag value received from the processor core into the tag storage, or by replacing the tag values previously stored in the tag storage with the tag value received from the processor core and clearing the tag ID or a valid bit of each said cache entry.

14. The microprocessor of claim 12, wherein the controller is associated with a finite state machine that includes a normal state and an inner state, the controller enters the normal state initially, the controller updates the tag storage with the tag value received from the processor core when the controller is in the normal state and the tag value received from the processor core is different from every tag value previously stored in the tag storage, the controller enters the normal state when the controller is in the inner state and the tag value received from the processor core is different from every tag value previously stored in the tag storage, the controller enters the inner state when the controller is in the normal state and receives an inner signal.

15. A method for using an instruction loop cache, comprising:
    entering a normal state initially, wherein the instruction loop cache is associated with a finite state machine that includes the normal state and an inner state;
    updating the instruction loop cache with a tag value sent from a processor core to the instruction loop cache when a current state is the normal state and the tag value is different from every tag value previously stored in the instruction loop cache;
    entering the normal state when the current state is the inner state and the tag value sent from the processor core to the instruction loop cache is different from every tag value previously stored in the instruction loop cache;
    entering the inner state when the current state is the normal state in response to receiving an inner signal; and
    determining whether the cache hit or a cache miss occurs in the instruction loop cache based on a comparison between a tag of a fetch address sent from the processor core to the instruction loop cache and one of the tag values stored in the instruction loop cache.

16. The method of claim 15, wherein the step of updating the instruction loop cache comprises:
    adding the tag value sent from the processor core into the instruction loop cache or replacing the tag values previously stored in the instruction loop cache with the tag value sent from the processor core.

17. A method for using an instruction loop cache, comprising:
    sending a tag value related to a hint instruction to the instruction loop cache whenever the hint instruction is fetched and recognized, wherein the hint instruction is associated through the tag value to an instruction loop to be executed after the hint instruction is executed, and wherein the instruction loop cache determines whether a cache hit or a cache miss occurs based on a comparison between a tag of a fetch address of an instruction and one of the tag values stored in the instruction loop cache.

18. The method of claim 17, wherein the hint instruction is a conditional branch instruction whose branch condition is always false and the tag value related to the hint instruction is a tag of a target address of the conditional branch instruction.

19. The method of claim 18, wherein the target address points to the instruction loop or a function to be called in the instruction loop.

20. The method of claim 17, wherein the hint instruction is a no-operation instruction, the hint instruction is placed immediately before the instruction loop, and the tag value related to the hint instruction is a tag of a fetch address of a first instruction of the instruction loop.

* * * * *